US012761042B2

(12) United States Patent
Kim

(10) Patent No.: US 12,761,042 B2
(45) Date of Patent: Oct. 13, 2026

(54) METHOD AND DEVICE FOR EXTRACTING INFORMATION

(71) Applicant: HL Klemove Corp., Incheon (KR)

(72) Inventor: Tae Han Kim, Incheon (KR)

(73) Assignee: HL Klemove Corp., Incheon (KR)

( * ) Notice: Subject to any disclaimer, the term of this patent is extended or adjusted under 35 U.S.C. 154(b) by 70 days.

(21) Appl. No.: 18/906,334

(22) Filed: Oct. 4, 2024

(65) Prior Publication Data

US 2025/0334422 A1 Oct. 30, 2025

(30) Foreign Application Priority Data

Apr. 30, 2024 (KR) ........................ 10-2024-0057489

(51) Int. Cl.
*G01C 21/00* (2006.01)

(52) U.S. Cl.
CPC ................................ *G01C 21/3819* (2020.08)

(58) Field of Classification Search
None
See application file for complete search history.

(56) References Cited

U.S. PATENT DOCUMENTS 9,910,443 B1 * 3/2018 Lee ........................ B60Q 1/346
10,955,855 B1 * 3/2021 Tran ........................ B60R 11/04
11,416,943 B2 * 8/2022 Shalev-Shwartz .... B60W 10/20
12,377,879 B2 * 8/2025 Jha .......................... H04W 4/40
2011/0184622 A1 * 7/2011 Yamada ................ B60W 40/02 701/99
2013/0328924 A1 * 12/2013 Arikan .................... G06T 11/00 345/629
2023/0162602 A1 * 5/2023 Vijaya ................. B60W 60/001
2023/0317347 A1 * 10/2023 Hoen .................. H01F 17/0006 331/167
2025/0251244 A1 * 8/2025 Niewiadomski ..... G06V 20/588

FOREIGN PATENT DOCUMENTS

KR 101866068 B1 7/2018
KR 10-2020-0073587 A 6/2020
KR 10-2021-0130324 A 11/2021

* cited by examiner

*Primary Examiner* — Hunter B Lonsberry
*Assistant Examiner* — Robert L Pinkerton
(74) *Attorney, Agent, or Firm* — Studebaker Brackett PLLC

(57) ABSTRACT

According to the present disclosure, there may be provided a device and a method for extracting information including receiving precision map information, and extracting geometry information associated with each lane in a preset section using the precision map information, and determining the existence of a pocket lane using change information of the geometry information.

20 Claims, 9 Drawing Sheets

METHOD AND DEVICE FOR EXTRACTING INFORMATION

CROSS REFERENCE TO RELATED APPLICATION

This application claims priority from Korean Patent Application No. 10-2024-0057489, filed on Apr. 30, 2024, which is hereby incorporated by reference for all purposes as if fully set forth herein.

TECHNICAL FIELD

An embodiment of the present disclosure relates to a method and device for extracting information for extracting the existence of a pocket lane using a precision map.

BACKGROUND

Recently, in the automobile industry, there is a great interest in a development of driving intelligence assistance and autonomous driving technology due to the development of information communication technology and the increasing importance of personal leisure.

Here, autonomous driving may refer to a technology capable of recognizing the surrounding environment without driver intervention, determining the driving situation, and controlling a vehicle by using sensors installed in the vehicle such as a light detection and ranging (LiDAR) or GPS a global positioning system (GPS) and external information such as map information. Through this, there may reduce the driving burden of a driver and provide the advantage of securing productive or leisure time in the vehicle.

In addition, there is actively developed various in-vehicle driving intelligence assistance functions such as lane keeping assistance technology and vehicle following control technology.

However, these vehicle functions may be implemented based on a number of sensors installed in the vehicle and information received from the outside. In addition, the functions may be operated based on specific situations, and the functions may not operate normally in situations where the preset conditions are not met.

Therefore, in order to control the vehicle more precisely, it is necessary to be able to receive and analyze various information such as precision map information and LiDAR sensor information.

In particular, precision map information is required to be analyzed to be used in actual vehicles due to the deviation of information types depending on various protocols, provision of information centered on geometry rather than specific situations, etc.

Therefore, a technology is required to recognize specific situation and extract surrounding environment information for vehicle control based on various information deviations and basic information.

SUMMARY

Embodiments of the present disclosure are to provide an information extraction method and a device capable of extracting the existence of a pocket lane using precision map information.

In accordance with an aspect of the present disclosure, there may be provided a method for extracting information including receiving precision map information, and extracting geometry information associated with each lane in a preset section using the precision map information, and determining the existence of a pocket lane using change information of the geometry information.

In accordance with another aspect of the present disclosure, there may be provided a device for extracting information including a receiver for receiving precision map information, and a determiner configured to extract geometry information associated with each lane in a preset section using the precision map information, and determine the existence a pocket lane using change information of the geometry information.

According to an embodiment of the present disclosure, it is possible to provide a method and a device for extracting information for extracting the existence of a pocket lane using precision map information.

DETAILED DESCRIPTION

Figure 1:
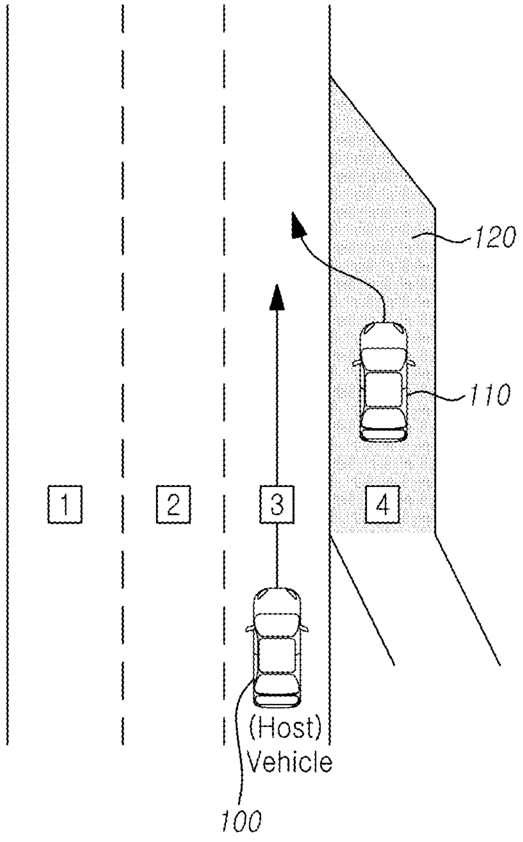
FIG. 1 is a diagram for explaining the necessity of determining a pocket lane according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

In the present disclosure, a pocket lane may mean a lane extended to merge into a main road or a lane extended to branch off from the main road. Alternatively, a pocket lane may mean a lane which is extended for a right turn, a left turn, or a U-turn.

In order for a vehicle to provide autonomous driving or driver assistance functions, there is required the recognition of accurate lane information and the surrounding situation. In this case, the existence of a pocket lane may be information for recognizing in advance the existence of a vehicle entering a pocket lane or a vehicle exiting a pocket lane.

However, the current precision map information may only provide information such as geometry information and lane width related to a lane, and may not provide information on whether the corresponding lane is a pocket lane. In addition, the precision map information may provide information that is not standardized by each generation company. Therefore, it is difficult for a vehicle control device to use the precision map information.

In this situation, the present disclosure may propose a technology capable of detecting the existence of a pocket lane or distinguishing a pocket lane by using only the geometry information which is basically/commonly included in the precision map information.

Hereinafter, it will be described a method and a device for extracting information assuming that the device is installed in a vehicle. However, this is described with a focus on an example utilized in a vehicle to help understanding. Therefore, a method and a device for extracting information according to the present disclosure are not limited to being installed in a vehicle. That is, the device for extracting information according to the present disclosure may be installed and utilized in various devices, and there is no limitation thereto.

FIG. 1 is a diagram for explaining the necessity of determining a pocket lane according to an embodiment.

Referring to FIG. 1, in order to implement an autonomous driving vehicle or a vehicle equipped with a driving assistance function, there may be essential precision map information capable of precisely checking the road conditions. Recently, there is increasing the trend of utilizing precision map information to implement an advanced autonomous driving system from level 2 to level 4 in vehicles, especially among automobile manufacturers.

If a vehicle 100 is driving on a three-lane road, the fourth lane in front may be formed as a pocket lane 120. In the pocket lane 120, another vehicle 110 may exist to enter the third lane. In this case, the vehicle 100 driving on the third lane may need to prepare for another vehicle 110 attempting to enter the third lane from the pocket lane 120.

In the case of an autonomous driving function or a driving assistance function, radar, camera, and lidar sensors may be used to monitor the vehicles in front and prevent collisions. However, the collision avoidance function can be activated when another vehicle 110 is detected by a sensor installed in the vehicle 100 and another vehicle 110 is detected entering the third lane, which is the driving lane of the vehicle 100.

In the case where another vehicle 110 attempting to enter the driving lane exists in a short section such as a pocket lane 120, the time to detect another vehicle 110 and determine whether of entry may be extremely limited.

Therefore, in the case where a pocket lane 120 exists, it is necessary to determine whether to yield to another vehicle 110 more quickly in advance. In addition, in order to determine whether to yield to another vehicle 110 or whether another vehicle 110 will yield, it is necessary to quickly determine that another vehicle 110 is driving in the pocket lane 120.

However, since precision map information is produced by various map production companies, information about pocket lanes 120 may vary depending on the map production company, and there may be many cases that information on the pocket lane is not provided.

In this situation, if it is possible to determine in advance whether a pocket lane 120 exists and quickly determine that another vehicle 110 is driving in the pocket lane 120, it will be possible to more quickly determine the risk of collision and take action to prevent the collision.

Therefore, hereinafter, it will be described a technology for determining whether a pocket lane exists based on precision map information. Since pocket lanes may appear in various forms, there is required more accurate determination, and there may be provided a technology for determining whether a pocket lane exists using only the geometry information which is basically provided regardless of the map production company.

Figure 2:
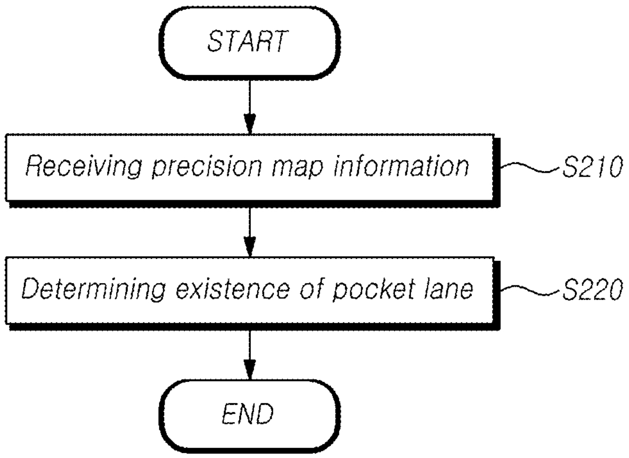
FIG. 2 is a flowchart of a method for extracting information to an embodiment.

FIG. 2 is a flowchart of a method for extracting information to an embodiment.

Referring to FIG. 2, the information extraction method for extracting the existence of a pocket lane may include a receiving step for receiving precision map information (S210).

For example, the precision map information may include at least one of geometry information for a predetermined number of sections based on a driving direction of a vehicle, display information allocated to each lane, width information for each lane, and coordinate information for the geometry information. The geometry information may be displayed in the form of a line connecting the coordinate information included in the precision map information. For example, the geometry information may be displayed in the form of a line connecting the center coordinates of each lane. If the precision map information includes center coordinates for each lane at a predetermined interval, the information extraction method may generate geometry information formed in the form of a line connecting the center coordinate information. Alternatively, the precision map information may directly include geometry information configured in the form of a center line of a lane.

In this specification, a lane means a passage set for a vehicle to pass through, and may mean an area formed between a road line and an adjacent road line. The road line may mean a line used to separate lanes.

The precision map information may be received using an in-vehicle communication device such as a navigation system. Alternatively, the precision map information may be configured by being stored in advance in the vehicle. Precision map information may be received in real time for a certain range around the vehicle according to the vehicle's driving due to issues such as capacity. Alternatively, precision map information may be received only for a part related to the driving path using the vehicle's driving path information.

The information extraction method may include a determination step of extracting geometry information associated with each lane in a preset section using precision map information, and determining whether a pocket lane exists using change information in the geometry information (S220).

For example, in the determination step, information included in the precision map information may be used to determine whether a pocket lane exists on a driving path of a host vehicle. In addition, the precision map information may provide information on preset sections. That is, precision map information for a certain distance range in a direction of the driving path of a host vehicle may be provided in real time. In this case, the precision map information may provide the information by dividing into preset sections based on the location of the host vehicle.

For example, the preset sections may be included in the precision map information, and may be set to the same distance or a different distance according to the proximity to the vehicle. For example, the preset sections may be provided by dividing the distance into the same sections on the precision map information. Alternatively, the preset sections may be set so that each section becomes larger or smaller as being away from the vehicle. Alternatively, the preset sections may be set to different sizes depending on a speed of the host vehicle.

The determination step may include determining the existence of a pocket lane using precision map information.

For example, the determination step may include extracting geometry information as a line connecting the center coordinate values of each lane, and extracting one geometry information for each lane to produce change information. If the precision map information includes geometry information, the determination step may include extracting geometry information included in the precision map information and checking the extracted geometry information for each lane to produce change information of the geometry information.

For example, the determination step may include calculating the number of geometry information for each preset section in a preset order, and determining change information according to the change in the number of geometry information. For example, the preset order may be set according to a first direction set in the order from a first section including a host vehicle to a N-th section located farthest from the host vehicle, and a second direction set in the order from the N-th section to the first section. In this case, the N may set as a natural number greater than or equal to 2.

That is, the determination step may include counting the number of geometry information in the first section including the host vehicle and counting the number of geometry information in the second section when determining change information in the first direction. In this order, the number of geometry information in each section up to the N-th section may be counted. If the number of geometry information from the first section to the N-th section is all the same, the change information may be determined as no change, and there may be determined that there is no pocket lane.

Similarly, in the determination step, the number of geometry information may be counted from the N-th section and up to the first section in the second direction, and the change information may be determined using the change in the numbers of the geometry information. If the number of geometry is three in a third section and increases to four in a fourth section, the change information may be determined that one geometry information has increased.

The determination step may include sequentially or simultaneously producing change information for the first direction and the second direction.

The determination step may include determining that a pocket lane exists if the change information determined according to at least one of the first direction and the second direction is determined to be an increase in the number of geometry information. In addition, in the determination step, a location of the pocket lane may be determined by using a section in which the number of geometry information has increased. In the determination step, there may determine that a pocket lane exists if an increase in the number of geometry information is occurred in either the first direction or the second direction.

Meanwhile, the determination step may include determining a section within a preset length of a lane associated with the increased geometry information in a preset section as a pocket lane. There may be a section where the pocket lane is formed very long. In this case, if the entire section is determined to be a pocket lane, there may be performed unnecessary detection of other vehicles in the pocket and collision prevention operations. This is because the quick determination of the pocket lane and the collision risk detection operation for other vehicles in the pocket lane are required in the case that the length of the pocket lane is limited, so that other vehicles should inevitably change lanes to the main lane. Therefore, if the pocket lane is formed longer than a certain distance, there may be used a method of detecting other vehicles' lane changes using general other vehicle detection logic in order to prevent waste of computing power.

Accordingly, the determination step may prevent unnecessary waste of computing power by determining the existence of a pocket lane only for a preset specific length. In addition, there may prevent a decrease in ride comfort due to unnecessary increase in collision sensitivity. For example, the preset specific length may be set to 200 m, but is not limited thereto. The preset specific length may increase or decrease depending on the speed of the host vehicle. For example, the higher the speed of the host vehicle, the higher the preset specific length.

The possibility of other vehicles entering at the end of the pocket lane may be almost 100%. Therefore, at the point where the pocket lane ends (i.e., the point where the pocket lane gradually narrows), there may be required the sensitivity of the collision risk determination to be greatly increased to ensure stability.

For this purpose, the determination step may include calculating a distance between the geometry information, and determining an area where the calculated distance using the increased geometry information is less than or equal to a threshold value as a tapering area. Alternatively, the determination step may include determining an area where an angle formed by the increased geometry information with the driving direction of a vehicle is changed as a tapering area. The tapering area may be set as a point where the width of the pocket lane gradually decreases toward the end of the pocket lane. If another vehicle is detected in the tapering area, since the risk of collision may be very high, the behavior of the host vehicle may be controlled by expecting that another vehicle will enter the main lane.

As described above, the information extraction method may include determining the existence of a pocket lane regardless of the type of precision map information and the precision map manufacturer. In addition, the information extraction method may include determining the presence of a pocket lane in two directions, and processing and analyzing the information to efficiently detect another vehicle in the pocket lane by considering the tapering area and the long pocket lane shape. Therefore, it is possible to provide analysis of safer and more accurate information.

Hereinafter, it will be described the information extraction method in more detail with reference to drawings considering various road types.

Figure 3:
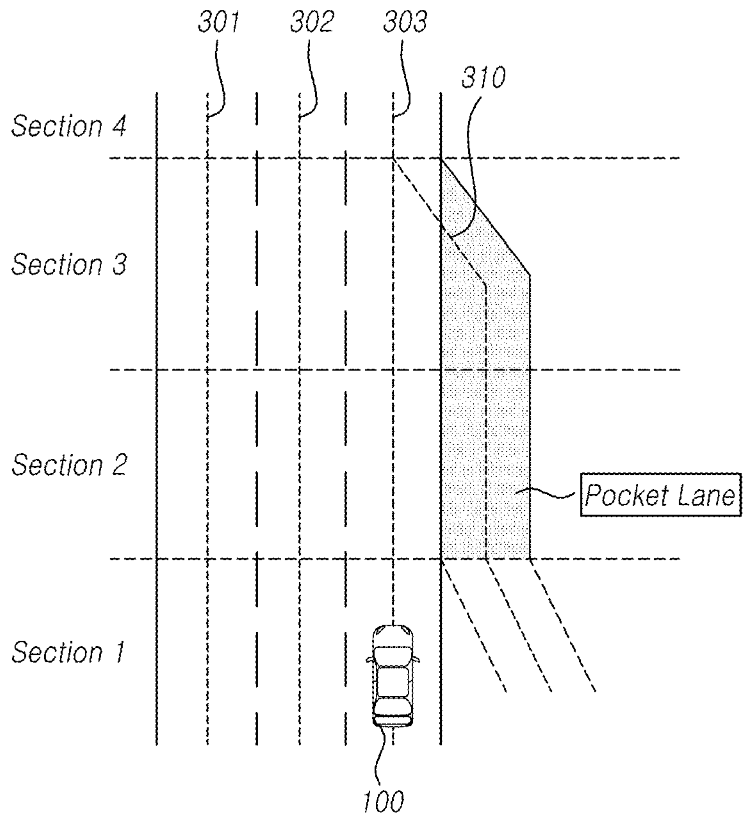
FIG. 3 illustrates an operation for determining the existence of a pocket lane according to an embodiment.

FIG. 3 illustrates an operation for determining the existence of a pocket lane according to an embodiment.

Referring to FIG. 3, the precision map information may include information on four preset sections. Here, sections 1 to 4 are illustrated. The preset sections are exemplary and are not limited thereto.

The precision map information may include geometry information 301, 302, 303 and 310 associated with to each lane in the preset section. For example, the geometry information 301, 302, 303 and 310 may be included in the precision map information as a line connecting the center point of each lane. Alternatively, the geometry information 301, 302, 303 and 310 may be extracted by an information extraction device by connecting coordinate information included in the precision map information.

The geometry information 301, 302, 303 and 310 may be expressed as a line connecting the center points of each lane. The precision map information may not include information about lanes, and may include information about each lane only as geometry information 301, 302, 303 and 310.

If the host vehicle 100 is driving in a third lane, it is necessary to check a pocket lane in a fourth lane. However, since the precision map information includes only geometry information 301, 302, 303 and 310, there may be difficult to clearly check the existence of the pocket lane.

Meanwhile, the preset sections 1 to 4 may all be set to the same interval. Alternatively, sections 1 to 4 may be set to different intervals. For example, the interval of section 1 may be set to be the largest and the interval may be set to be smaller as approaching to section 4 at a certain rate. Alternatively, the interval of section 1 may be set to be the narrowest and the interval may be set to be wider as going to section 1 at a certain rate.

Alternatively, the preset sections may be set to equal intervals or to differential intervals, and may be set variably according to a speed of the host vehicle 100. For example, the faster the vehicle speed, the larger the preset sections of equal intervals may be set.

The information extraction method according to the present disclosure may include determining whether a pocket car exists by determining change information using the number of geometry information in each section. In this case, the change information may be calculated in a first direction or a second direction. Here, it will be described based on the second direction which is a direction from a long distance to a short distance from the host vehicle 100, and an example of the first direction will be described with reference to another drawing.

If the host vehicle 100 receives precision map information set to four sections, the number of geometry information in each section may be calculated.

The section 4 may include geometry information of 301, 302, and 303. Therefore, three pieces of geometry information may be determined in the section 4. Geometry information of 310 may be determined in a section 3 in addition to 301, 302, and 303. Therefore, four pieces of geometry information are determined in the section 3. Therefore, the number of the geometry information increases by one from the section 4 to the section 3. In a section 2, four pieces of geometry information may be determined in the same manner as in the section 3, and in a section 1, three pieces of geometry information 301, 302 and 303 are determined.

Therefore, the information extraction method may check that the total number of lanes increases in the section 3 and the section 2, and may determine that pocket lanes exist in the section 3 and the section 2. As described below, if a pocket lane is determined to be longer than a preset length, only sections within the preset length may be determined as a pocket lane. In addition, as described below, the tapering area of the corresponding pocket lane may be determined by using the change information, a distance between the geometry information, or an angle change of the geometry information.

Figure 4:
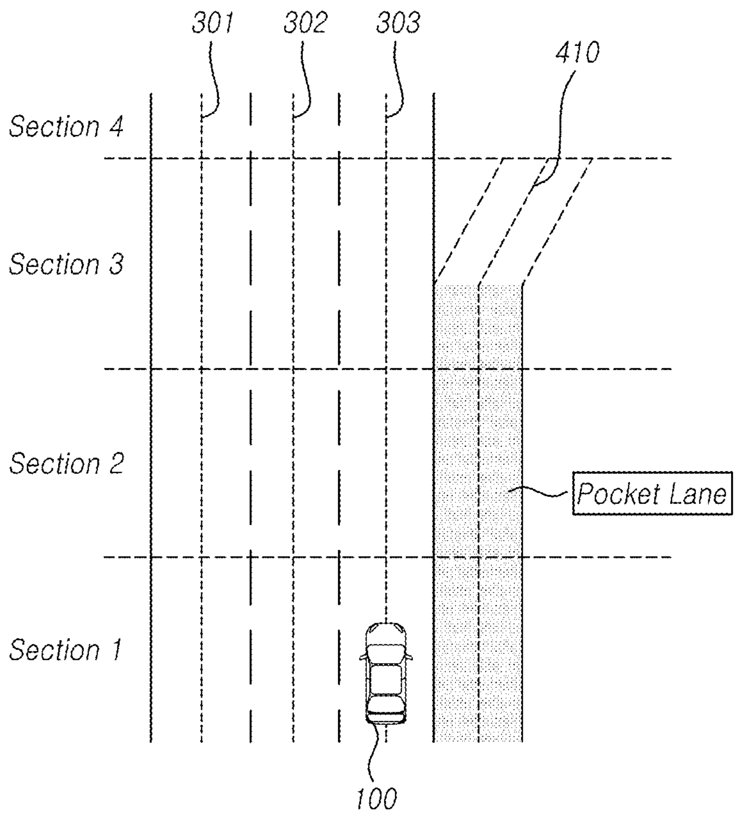
FIG. 4 illustrates an operation for determining the existence of a pocket lane according to another embodiment.

In the case of a pocket lane with an increasing number of lanes, the pocket lane may be determined as in FIG. 3, FIG. 4 illustrates an operation for determining the existence of a pocket lane according to another embodiment.

Referring to FIG. 4, it will be described a case where a pocket lane is an exit. There may be received precision map information including four preset sections as in FIG. 3.

When performing the determination in the second direction, there may be determined that three pieces of geometry information 301, 302 and 303 in a section 4 represent a lane.

In a section 3, geometry information of 410 may be added to the geometry information 301, 302 and 303 of section 4. Therefore, there may be detected a change in which the geometry information increases by one.

There may be determined that the geometry information 301, 302, 303 and 410 are maintained as four in the case of a section 2 and a section 1.

Therefore, there may be determined that a pocket lane exists in the section extending from the section 1 to the section 3. Similar to FIG. 3, the existence of a pocket lane may be determined, but it may be difficult to determine whether the pocket lane is an exit lane or an entry lane based only on the change in the number of pocket lanes. Accordingly, the information extraction method may include determining whether it is an exit lane or an entry lane by checking the change in an interval between the geometry information 410 determined as a pocket lane and the geometry information 301, 302 and 303 associated with the existing lane. In the case of an exit lane, the interval between 303 and 410 may increase in the driving direction in the section where the number of geometry information changes. In contrast, in the case of an entry lane, the interval between 303 and 310 may decrease in the driving direction in the section where the number of geometry information changes, as shown in FIG. 3.

However, if a pocket lane exists, there may be a vehicle attempting to enter the main lane from the pocket lane regardless of whether the pocket lane is an exit lane or an entry lane, so the description will focus on determining the pocket lane area. The entry and exit lane determination as described above may be equally applied to other examples in this specification.

Similarly to FIG. 3, in FIG. 4, if a pocket lane appears longer than a preset length, there may be determined as a pocket lane only for a section within the preset length.

Figure 5:
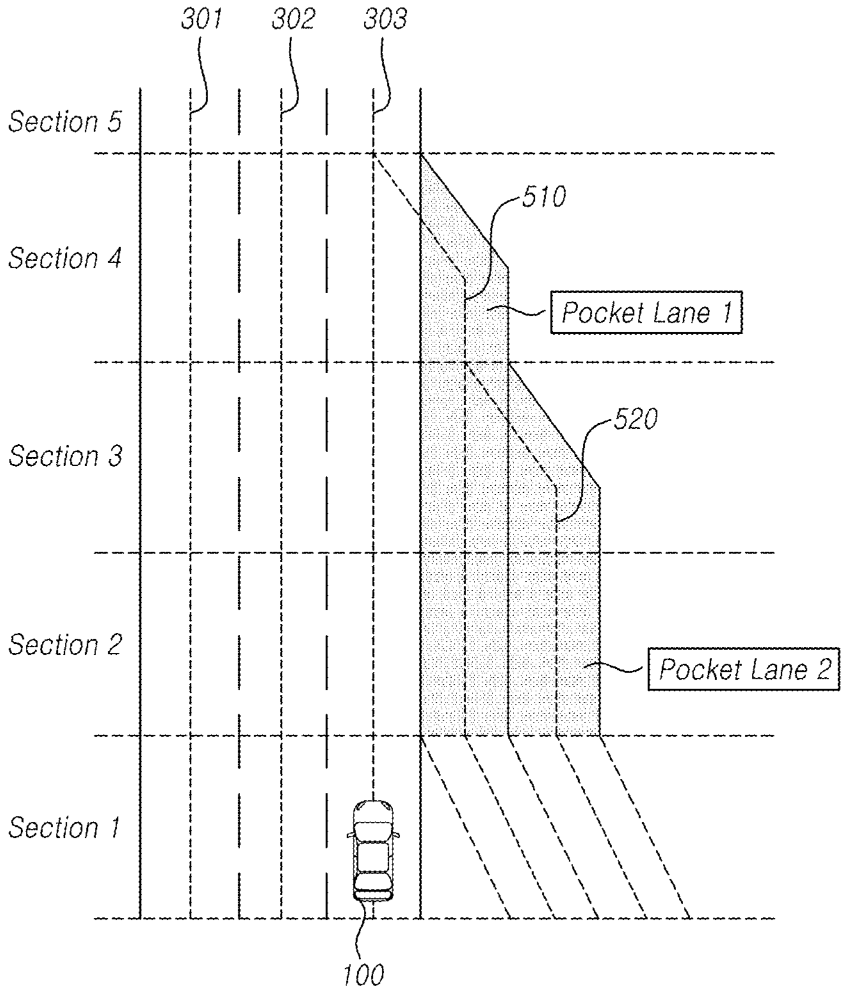
FIG. 5 illustrates an operation for determining the existence of a pocket lane according to another embodiment.

FIG. 5 illustrates an operation for determining the existence of a pocket lane according to another embodiment.

Referring to FIG. 5, it is also possible to determine the existence of a multi-pocket lane. In the case of a multi-pocket lane, the number of other vehicles attempting to enter the main lane may increase significantly. Accordingly, the risk of collision may also increase. The case where there are two pocket lanes is described as an example, but it is not limited thereto.

In this embodiment, the description is centered on the case where there are five preset sections.

The host vehicle 100 may receive precision map information about the front of the driving direction. The information extraction method may include extracting geometry information from the precision map information.

Assuming the second direction, three pieces of geometry information 301, 302 and 303 may be extracted from a section 5. In a section 4, geometry information of 510 may be additionally extracted in addition to geometry information 301, 302 and 303, so that a total of four geometry information 301, 302, 303 and 510 may be extracted. Therefore, there may be determined that there is a change in geometry information in the section 4. In this case, as in FIG. 3, there may be determined that a pocket lane 1 is included in the corresponding section.

In a section 3, geometry information of 520 may be added in addition to geometry information 301, 302, 303 and 510 of the section 4. Therefore, there may be determined that there are five geometry information 301, 302, 303, 510 and 520 in the section 3. Hereinafter, it is assumed that five pieces of geometry information are maintained in a section 2. In a section 1, there may be determined that the geometry information 301, 302 and 303 is reduced to three again.

Using this change information, there may be determined that a pocket lane area exists from the section 4 to the section 2. In addition, the information extraction method may include determining that a pocket lane 1 and a pocket lane 2 are formed in an area from the section 4 to the section 2 and an area from the section 3 to the section 2, respectively.

The geometry information corresponding to the entrances of 510 and 520 in the section 1 may or may not be included in the precision map information. This may vary depending on the information provided by each map production company. If the geometry information of 510 and 520 is included in the section 1, in the information extraction method, the gap difference between 301 to 303 and 510 and 520 may be extracted, and the increased lane in the section 1 may not be determined as a pocket lane area. This is because the section 1 is a section where third to fifth lanes are not connected, and another vehicle may not enter the driving lane of the host vehicle 100 in the section 1.

Figure 6:
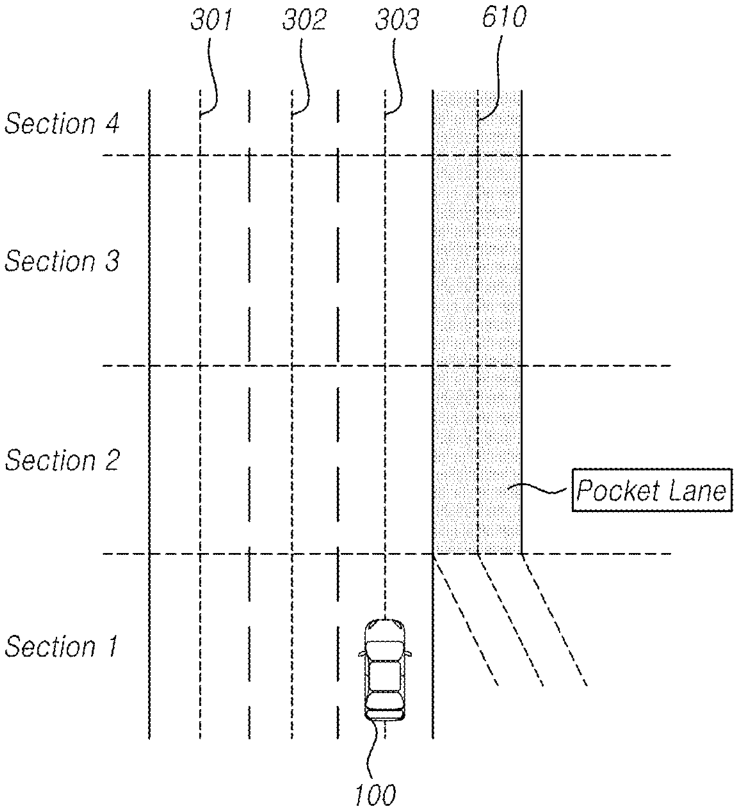
FIG. 6 is a diagram for explaining an operation for determining the existence of a pocket lane in another direction according to an embodiment.

FIG. 6 is a diagram for explaining an operation for determining the existence of a pocket lane in another direction according to an embodiment.

Referring to FIG. 6, the information extraction method may determine whether a pocket lane exists in the first direction as well as the second direction described above. The information extraction method may perform the determination simultaneously or sequentially for the first direction and the second direction. If the information extraction method determines that there is a pocket lane in at least one of the first direction and the second direction, a lane in the corresponding area may be determined as a pocket lane.

For example, it will be described the case of determining in the first direction. The precision map information may include information on four preset sections. In this case, the description will be made assuming that geometry information of 610 in a section 1 is not included in the precision map information.

The information extraction method may extract three pieces of geometry information 301, 302 and 303 in the section 1. Afterwards, the information extraction method may extract the geometry information of 610 in addition to the geometry information 301, 302 and 303 in a section 2, and may count a total of four pieces of geometry information. Since three pieces of geometry information are produced in the section 1 and four pieces of geometry information are produced in the section 2, the information extraction method may determine a lane linked to the geometry of 610 as a pocket lane.

The information extraction method may sequentially extract the geometry information 301, 302, 303 and 610 of a section 3 and a section 4 in the same way, and produce four pieces of geometry information for each section.

Therefore, the information extraction method may determine that a pocket lane exists from the section 2 to the section 4. However, if there is a lane continuously linked to the geometry information of 610 after the section 4, unnecessary waste of computing power may occur in continuously determining a pocket lane and detecting the risk of collision.

Therefore, as described above, the information extraction method may include determining a section within the preset length of a lane linked to the increased geometry information in a preset section as a pocket lane. This will be explained with reference to FIG. 7 below.

Figure 7:
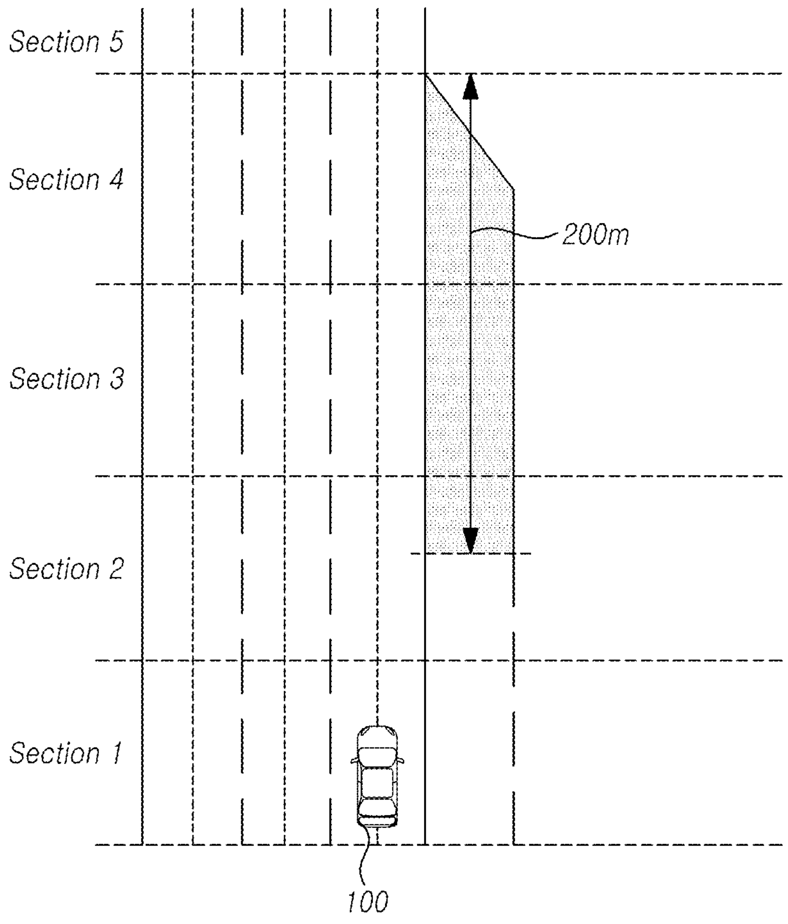
FIG. 7 is a diagram for explaining an operation for determining by limiting a pocket lane section according to one embodiment.

FIG. 7 is a diagram for explaining an operation for determining by limiting a pocket lane section according to one embodiment.

Referring to FIG. 7, the information extraction method may determine a section within a preset length of a lane linked to increased geometry information in a preset section as a pocket lane.

As described above, if the increased geometry information continues for a certain section or a certain length, there may be determined as a very long pocket lane or an increase in the lane. In this case, there is a high possibility that another vehicle will approach within a certain length based on the section where the number of geometry information has increased, but there may be desirable to maintain the detection level for a general lane in a section that continues after the certain length.

Therefore, in the case of the determination from a section 5 to a section 4, the information extraction method may determine a pocket lane only up to a preset length (e.g., 200 m) if the pocket lane continues from the section 4 to a section 1. In this case, a reference point of the preset length determined as the pocket lane may be set to the preset specific length from the section 4 determined as due to increase of the geometry information.

Similarly, when determining in the first direction, the information extraction method may confirm that the same number of geometry information is maintained from the section 1 to the section 4. Thereafter, the information extraction method may confirm that the number of geometry information is reduced by one in a section 5.

In this case, the pocket lane may be determined based on the preset length of the section 4 where the number of geometry information is reduced, rather than the location of the host vehicle 100.

This is because there is a high possibility that another vehicle may actively enter the section where the lane is reduced.

Meanwhile, the information extraction method may also monitor risk zones by differentially distinguishing zones within the pocket lane area.

Figure 8:
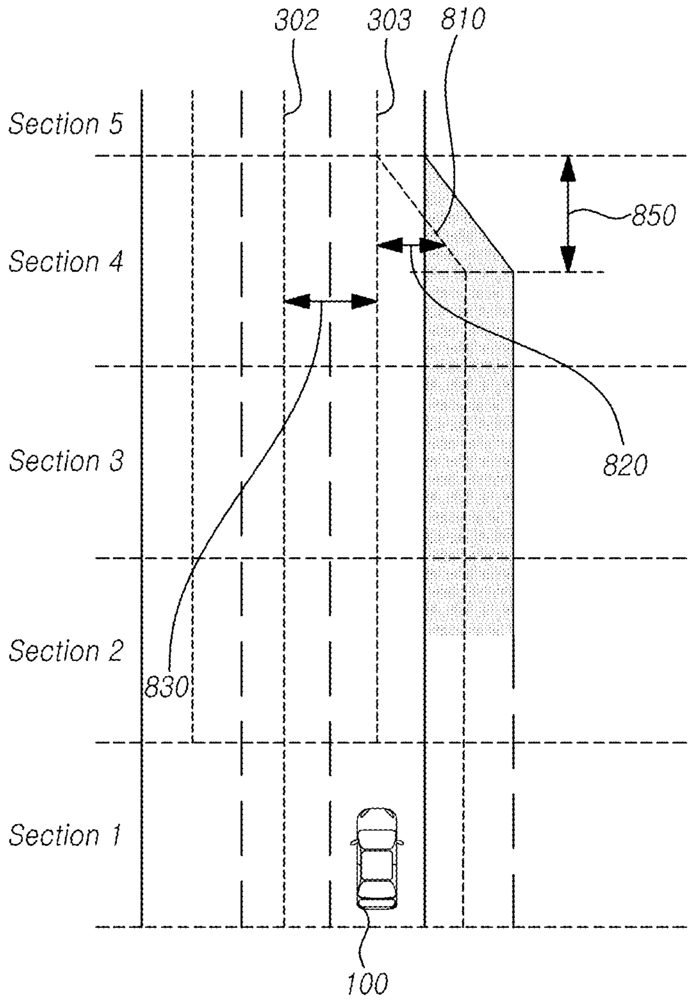
FIG. 8 illustrates an operation for extracting by dividing a tapering area according to one embodiment.

FIG. 8 illustrates an operation for extracting by dividing a tapering area according to one embodiment.

Referring to FIG. 8, the information extraction method may calculate the distance between the geometry information, and may determine an area where the calculated distance using the increased geometry information is less than or equal to a threshold value as a tapering area (850).

In the case of a pocket lane, the width of the lane may decrease in a certain section and the lane may disappear. In particular, in the section where the width of the lane decreases, there is a very high possibility that another vehicle driving in the pocket lane will change lanes to the main lane.

Therefore, in a specific area of the pocket lane (e.g., tapering area), the risk of collision and the possibility of another vehicles changing lanes should be determined to be extremely high.

To this end, the information extraction method may determine the existence of a pocket lane using the methods of FIG. 2 to FIG. 7 described above. In particular, in the case where the length of the pocket lane is long, there may be determined that the pocket lane exists from a section 4 to a certain part of section 2 using a method such as FIG. 7.

For example, the information extraction method may set the section 4 immediately before the number of geometry information changes as a tapering area. This may be a method for minimizing the consumption of computing power by determining using a preset section.

As another example, the information extraction method may calculate an interval 830 between the geometry information using the geometry information 302 and 303 associated with the main lane on which the host vehicle 100 is driving. The information extraction method may calculate an interval 820 between the geometry information 810 linked to the pocket lane and the geometry information 302 or 303. The information extraction method may set a section where the interval 820 decreases as a tapering area 850.

As another example, the information extraction method may quickly determine the tapering area 850 by extracting section 4 and calculating the interval 820 only in the section 4.

As another example, the information extraction method may determine the tapering area 850 based on whether there is a change in the angle information formed by the driving direction of the host vehicle 100 and the geometry information 810. For example, the geometry information 810 may appear parallel to the driving direction of the host vehicle or the geometry information of 303. Then, in the tapering area 850, the angle of the geometry information of 810 may be changed so that the geometry information of 810 may be combined with 303. The information extraction method may determine the tapering area 850 by using this angle change.

In this way, the information extraction method may quickly and accurately extract additional information such as the existence of a pocket lane, the pocket lane area, and the tapering area based on the minimum information provided by the precision map information.

In addition, by using the extracted information, the risk of collision may be reduced by more quickly detecting in advance the lane change intention of another vehicle driving in the pocket lane.

Hereinafter, it will be exemplarily described a configuration of an information extraction device for performing the information extraction method as above with reference to the drawings. Each configuration described below is exemplarily illustrated to help understanding, and may perform part or all of the operations of FIGS. 1 to 8 described above. In addition, each configuration may be implemented as one electronic control unit. Alternatively, each configuration may be logically configured as a part of an electronic control unit providing other functions.

Figure 9:
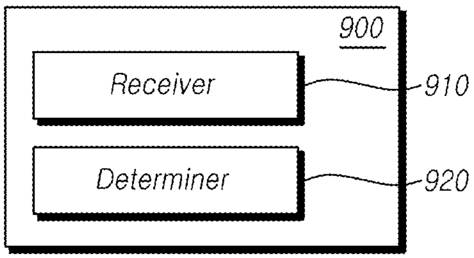
FIG. 9 illustrates a configuration of a device for extracting information according to an embodiment.

FIG. 9 illustrates a configuration of a device for extracting information according to an embodiment.

Referring to FIG. 9, an information extraction device 900 for extracting the existence of a pocket lane may include a receiver 910 for receiving precision map information, and a determiner 920 for extracting geometry information associated with each lane in a preset section using the precision map information, and determining the presence or absence of a pocket lane using change information of the geometry information.

For example, the precision map information may include at least one of geometry information for a certain number of preset sections based on the driving direction of the host vehicle, display information allocated to each lane, width information for each lane, and coordinate information for the geometry information. The geometry information may be displayed in the form of a line connecting the coordinate information included in the precision map information. For example, the geometry information may be displayed in the form of a line connecting the center coordinates of each lane. If the precision map information includes center coordinates for each lane at a certain interval, the information extraction device may also generate geometry information formed in the form of a line connecting the center coordinate information. Alternatively, the precision map information may directly include geometry information configured in the form of a center line of a lane.

The receiver 910 may receive the precision map information using an in-vehicle communication device such as a navigation system. Alternatively, the precision map information may be configured by being stored in advance in the vehicle. The precision map information may be received in real time for a certain range around the vehicle according to the vehicle's driving due to issues such as capacity. Alternatively, the precision map information may be received only for a portion related to the driving path using the vehicle's driving path information.

For example, the determiner 920 may determine whether a pocket lane exists on the vehicle's driving path using information included in the precision map information. In addition, the precision map information may provide information on a preset section. That is, precision map information for a certain distance range in the direction in which the vehicle is driving may be provided in real time. In this case, the precision map information may provide the provided information by dividing the information into preset sections based on the vehicle's location.

For example, the preset section may be included in the precision map information, and may be set to the same distance or a differential distance according to proximity to the host vehicle. For example, the preset section may be provided by dividing the distance into the same section on the precision map information. Alternatively, the preset section may be set so that each section becomes larger or smaller as being away from the host vehicle. Alternatively, the preset section may be set to a different size according to the speed of the host vehicle.

The determiner 920 may determine whether a pocket lane exists using the precision map information.

For example, the determiner 920 may extract geometry information as a line connecting the center coordinate values of each lane, and may extract one geometry information for each lane to determine the change information. If the precision map information includes geometry information, the determiner 920 may extract the geometry information included in the precision map information and check the extracted geometry information for each lane to determine change information of the geometry information.

For example, the determiner 920 may calculate the number of geometry information for each preset section in a preset order, and may determine the change information according to the change in the number of geometry information. For example, the preset order may be set according to a first direction set in the order from a first section including the position of the host vehicle to a N-th section located farthest from the host vehicle or a second direction set in the order from the N-th section to the first section. In this case, the N may be set as a natural number greater than or equal to 2.

That is, when determining the change information in the first direction, the determiner 920 may count the number of geometry information in the first section including the host vehicle, and may count the number of geometry information in a second section. In this order, the determiner 920 may count the number of geometry information in each section up to the N-th section. If the number of geometry information from the first section to the N-th section is all the same, the determiner 920 may determine change information as no change and determine that there is no pocket lane.

Similarly, the determiner 920 may count the number of geometry information in the N-th section in the second direction, and count the number of geometry information up to the first section, and determine the change information using the change in the number of geometry information. If the number of geometry information is three in a third section and increases to four in a fourth section, the determiner 920 may determine the increase in one piece of geometry information as change information.

The determiner 920 may determine the change information sequentially or simultaneously for the first direction and the second direction.

The determiner 920 may determine that a pocket lane exists if the change information calculated according to at least one of the first direction and the second direction is determined to be an increase in the number of geometry information. In addition, the determiner 920 may determine the location of the pocket lane by using a section in which the number of geometry information increased. The determiner 920 may determine that a pocket lane exists if an increase in the number of geometry information is occurred in either the first direction or the second direction.

Meanwhile, the determiner 920 may determine a section within a preset length of a lane linked to increased geometry information in a preset section as a pocket lane. There may be a section where the pocket lane is formed very long. In this case, if the entire section is determined to be a pocket lane, there may be performed unnecessary detection of other vehicles in the pocket lane and collision avoidance operations. Since another vehicle should inevitably change lanes to the main lane if the length of the pocket lane is limited, there may be required to quickly determine the existence of the pocket lane and perform the collision risk detection operation for another vehicles in the pocket lane. Therefore, if the pocket lane is formed longer than a certain distance, detecting a lane change of other vehicles using general detection logic may be a method for preventing waste of computing power.

Therefore, the determiner 920 may prevent unnecessary waste of computing power by determining the existence of a pocket lane only for a certain length. In addition, it is possible to prevent a decrease in ride comfort due to unnecessary increase in collision sensitivity. For example, the preset length may be set to 200 m, but is not limited thereto. The preset length may increase or decrease in conjunction with the speed of the vehicle. For example, the higher the speed of the vehicle, the more the preset length may increase.

Meanwhile, the possibility of another vehicle entering at the end of the pocket lane may be almost 100%. Therefore, it is necessary to greatly increase the sensitivity of the collision risk determination at the end of the pocket lane (for example, the point where the pocket lane gradually narrows) to secure stability.

To this end, the determiner 920 may calculate the distance between the geometry information, and determine an area where the calculated distance using the increased geometry information is less than or equal to a threshold value as a tapering area. Alternatively, the determiner 920 may determine the tapering area based on the angle change information of the increased geometry information. The tapering area may be set as a point where the width of the pocket lane gradually decreases toward the end of the pocket lane. If another vehicle is detected in the tapering area, the risk of collision may be set to be very high, and the behavior of the vehicle may be controlled by expecting that another vehicle is about to enter the main lane.

According to the information extraction method and the device of embodiments as described above, it is possible to determine the presence of a pocket lane regardless of the type of precision map information and the map manufacturer. In addition, it is possible to determine the presence of a pocket lane in two directions, and process and analyze information to efficiently detect another vehicle in the pocket lane by considering the tapering area and the long pocket lane shape. Accordingly, it is possible to provide analysis of safer and more accurate information.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A method for extracting information comprising:

receiving precision map information including geometry information representing centerlines of lanes divided into a plurality of preset sections along a driving direction of a host vehicle;

extracting, for each of the preset sections, geometry information corresponding to each lane;

counting a number of the geometry information in each preset section in at least one of a first direction from a section including the host vehicle to a distant section and a second direction opposite thereto;

determining change information based on a variation in the counted number of the geometry information between adjacent preset sections; and determining that a pocket lane exists when the change information indicates an increase in the number of geometry information in at least one preset section, and determining a location of the pocket lane based on the preset section in which the increase occurs, wherein the determination of the pocket lane is used to control a driving operation of the host vehicle.

2. The method of claim 1, wherein the precision map information includes at least one of the geometry information for a specific number of the preset sections based on a driving direction of a vehicle, display information allocated to each lane, width information of each lane, and coordinate information for the geometry information.

3. The method of claim 1, wherein the preset section is included in the precision map information, and is set to a same distance or a differential distance depending on a proximity to a vehicle.

4. The method of claim 1, wherein the determining includes extracting the geometry information by a line connecting a center coordinate values of each lane, and extracting one geometry information for each lane to determine the change information.

5. The method of claim 1, wherein the determining includes calculating the number of the geometry information for each preset section in a preset order, and determining the change information based on a change in the number of the geometry information.

6. The method of claim 5, wherein the preset order is set according to a first direction set in the order from a first section including a position of a host vehicle to a N-th section located farthest from the host vehicle, and a second direction set in the order from the N-th section to the first section, wherein N is a natural number greater than or equal to 2.

7. The method of claim 6, wherein the determining include determining that the pocket lane exists if the change information determined according to at least one of the first direction and the second direction is determined to be an increase in the number of the geometry information.

8. The method of claim 7, wherein the determining includes determining a section within a preset length of a lane associated with the increased geometry information in the preset section as the pocket lane.

9. The method of claim 7, wherein the determining includes calculating a distance between the geometric information, and determining an area where a distance calculated using the increased geometric information is less than or equal to a threshold value as a tapering area.

10. The method of claim 7, wherein the determining includes determining a tapering area based on an angle change of the increased geometry information.

11. A device for extracting information comprising:

a receiver for receiving precision map information including geometry information representing centerlines of lanes divided into a plurality of preset sections along a driving direction of a host vehicle; and a determiner configured to:

extract, for each of the preset sections, geometry information corresponding to each lane;

count a number of the geometry information in each preset section in at least one of a first direction from a section including the host vehicle to a distant section and a second direction opposite thereto;

determine change information based on a variation in the counted number of the geometry information between adjacent preset sections; and determine that a pocket lane exists when the change information indicates an increase in the number of geometry information in at least one preset section, and determine a location of the pocket lane based on the preset section in which the increase occurs, wherein the determiner is further configured to control a driving operation of the host vehicle based on the determination of the pocket lane.

12. The device of claim 11, wherein the precision map information includes at least one of the geometry information for a specific number of the preset sections based on a driving direction of a vehicle, display information allocated to each lane, width information of each lane, and coordinate information for the geometry information.

13. The device of claim 11, wherein the preset section is included in the precision map information, and is set to a same distance or a differential distance depending on a proximity to a vehicle.

14. The device of claim 11, wherein the determiner extracts the geometry information by a line connecting a center coordinate values of the each lane, and extracts one geometry information for each lane to determine the change information.

15. The device of claim 11, wherein the determiner calculates the number of the geometry information for each preset section in a preset order, and determines the change information based on a change in the number of the geometry information.

16. The device of claim 15, wherein the preset order is set according to a first direction set in the order from a first section including a position of a host vehicle to a N-th section located farthest from the host vehicle, and a second direction set in the order from the N-th section to the first section, wherein N is a natural number greater than or equal to 2.

17. The device of claim 16, wherein the determiner determines that the pocket lane exists if the change information determined according to at least one of the first direction and the second direction is determined to be an increase in the number of the geometry information.

18. The device of claim 17, wherein the determiner determines a section within a preset length of a lane associated with the increased geometry information in the preset section as the pocket lane.

19. The device of claim 17, wherein the determiner calculates a distance between the geometric information, and determines an area where a distance calculated using the increased geometric information is less than or equal to a threshold value as a tapering area.

20. The device of claim 17, wherein the determiner determines a tapering area based on an angle change of the increased geometry information.

* * * * *